United States Patent [19]

Shirai et al.

[11] Patent Number: 5,798,727
[45] Date of Patent: Aug. 25, 1998

[54] OBSTACLE RECOGNITION SYSTEM FOR VEHICLE

[75] Inventors: Noriaki Shirai, Oobu; Katsuhiko Hibino, Kariya; Takao Nishimura, Nagoya, all of Japan

[73] Assignee: Denso Corporation, Kariya, Japan

[21] Appl. No.: 777,967

[22] Filed: Dec. 24, 1996

[30] Foreign Application Priority Data

Dec. 25, 1995  [JP]  Japan .................. 7-337335

[51] Int. Cl.⁶ .................................................. G01S 13/96
[52] U.S. Cl. .................. 342/70; 342/71; 342/106; 342/107; 342/115; 340/903; 340/435; 340/436
[58] Field of Search ............................ 342/70, 71, 72, 342/90, 106, 107, 115; 340/903, 435, 436

[56] References Cited

U.S. PATENT DOCUMENTS

| | | | |
|---|---|---|---|
| 5,291,207 | 3/1994 | Kikuchi et al. | 342/70 |
| 5,612,699 | 3/1997 | Yamada | 342/70 |
| 5,629,669 | 5/1997 | Asano et al. | 340/436 |
| 5,631,639 | 5/1997 | Hibino et al. | 340/903 |

FOREIGN PATENT DOCUMENTS

| | | |
|---|---|---|
| 5-180933 | 7/1993 | Japan . |
| 5-288847 | 11/1993 | Japan . |
| 7-262498 | 10/1995 | Japan . |
| 7-262499 | 10/1995 | Japan . |
| 7-291063 | 11/1995 | Japan . |
| 7-294634 | 11/1995 | Japan . |
| 7-296298 | 11/1995 | Japan . |
| 7-318652 | 12/1995 | Japan . |
| 8-279099 | 10/1996 | Japan . |

*Primary Examiner*—John B. Sotomayor
*Attorney, Agent, or Firm*—Cushman Darby & Cushman IP Group of Pillsbury Madison & Sutro LLP

[57] ABSTRACT

In an obstacle recognition system for a vehicle, transmission wave is irradiated per given angle for recognizing an obstacle ahead of the subject vehicle based on angle/distance data obtained from received reflected wave. A position of the obstacle is estimated based on a previously recognized position of the obstacle. The estimated position of the obstacle and an actually recognized position of the obstacle are compared so as to determine whether the obstacle currently recognized is identical with the obstacle previously recognized. Relative acceleration is derived for the obstacle which has been determined plural times to be identical with the previously recognized obstacle. When the derived relative acceleration is outside a given range, the corresponding obstacle is excluded from objects of further obstacle recognition.

4 Claims, 9 Drawing Sheets

5,798,727

1

OBSTACLE RECOGNITION SYSTEM FOR VEHICLE

BACKGROUND OF THE INVENTION

1. Field of the Invention

The present invention relates to an obstacle recognition system for a vehicle which irradiates transmission wave over a given angle around the subject vehicle and recognizes an obstacle around the subject vehicle based on reflected wave of the transmission wave.

2. Description of the Prior Art

There have been proposed obstacle recognition systems which irradiate transmission wave, such as the light wave or the millimeter wave, over a given angle around the subject vehicle and recognize an obstacle around the subject vehicle by monitoring reflected wave of the transmission wave. The obstacle recognition system is applied to, for example, a system where an alarm is given upon detection of an obstacle, such as a preceding vehicle, within a given distance or a system where the vehicle speed is controlled so as to maintain a given distance between the subject vehicle and the preceding vehicle.

In the obstacle recognition system of this kind, as disclosed in Japanese First (unexamined) Patent Publication No. 7-318652, it has been proposed to estimate a position of an obstacle based on a previously detected position of the obstacle and compare the estimated position and a newly and actually detected position thereof so as to determine whether the obstacle is identical with the previously recognized obstacle. Through this process, it can be determined whether the obstacle is stopped or moving, so that erroneous detection of a roadside thing, such as a reflector on a guard rail, as a preceding vehicle can be prevented to some degree.

However, in the system of this kind, when the vehicle speed is substantially equal to a value obtained by dividing an interval between the reflectors or the like by a period of irradiation of the transmission wave, it is likely that the roadside reflector or the like is detected as a preceding vehicle in error. For example, as shown in FIG. 10, it is assumed that reflectors 55a, 55b and 55c are arranged in turn on a guard rail 53 and a vehicle 51 is running on a road at the foregoing speed. In this case, the transmission wave irradiated from the vehicle 51 per the foregoing irradiation period becomes as shown by reference marks 57a, 57b and 57c in FIG. 10, so that positional relationships between the transmission wave 57a and the reflector 55a, between the transmission wave 57b and the reflector 55b and between the transmission wave 57c and the reflector 55c become the same with each other.

Accordingly, as shown in FIG. 11, the obstacle recognition system installed in the vehicle 51 recognizes images 59a, 59b and 59c of the reflectors 55a, 55b and 55c at substantially the same positions on the coordinate plane with an X-axis corresponding to a widthwise direction of the vehicle 51 and a Y-axis corresponding to a longitudinal direction thereof. Thus, the system recognizes the reflectors 55a to 55c as one preceding vehicle running at a speed substantially equal to that of the vehicle 51.

As described above, there has been a possibility in the conventional obstacle recognition system that the roadside thing, such as the reflector, is recognized as an obstacle, such as the preceding vehicle.

SUMMARY OF THE INVENTION

Therefore, it is an object of the present invention to provide an improved obstacle recognition system for a vehicle.

2

According to one aspect of the present invention, an obstacle recognition system for a vehicle comprises radar means for irradiating transmission wave over a given angle around the subject vehicle and, based on reflected wave of the transmission wave, detecting angles and distances of a reflecting object relative to the subject vehicle; recognition means for recognizing an obstacle around the subject vehicle based on the angles and the distances detected by the radar means; position estimating means for estimating a position of the obstacle to be recognized by the recognition means, based on a position of the obstacle previously recognized; identity determining means for comparing the position of the obstacle estimated by the position estimating means and a position of the obstacle recognized by the recognition means so as to determine whether the obstacle currently recognized by the recognition means is identical with the obstacle previously recognized; acceleration deriving means for deriving relative acceleration of the obstacle determined plural times by the identity determining means to be identical with the previously recognized obstacle; and excluding means for, when the relative acceleration derived by the acceleration deriving means is outside a given range, excluding the corresponding obstacle from objects of subsequent position estimation performed by the position estimating means and subsequent identity determination performed by the identity determining means.

It may be arranged that the acceleration deriving means derives relative accelerations of plural kinds with different sampling periods, and that the excluding means, when at least one of the relative accelerations is outside a corresponding given range which is set for each of the plural kinds of the relative accelerations, excludes the corresponding obstacle from the objects of the subsequent position estimation performed by the position estimating means and the subsequent identity determination performed by the identity determining means.

It may be arranged that the recognition means comprises point recognition means for recognizing the obstacle as points based on the angles and the distances detected by the radar means, unifying means for unifying neighboring points among the points recognized by the point recognition means, and segment recognition means for recognizing a set of the points unified by the unifying means, as a segment having only a length in a widthwise direction of the subject vehicle.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings.

Figure 1:
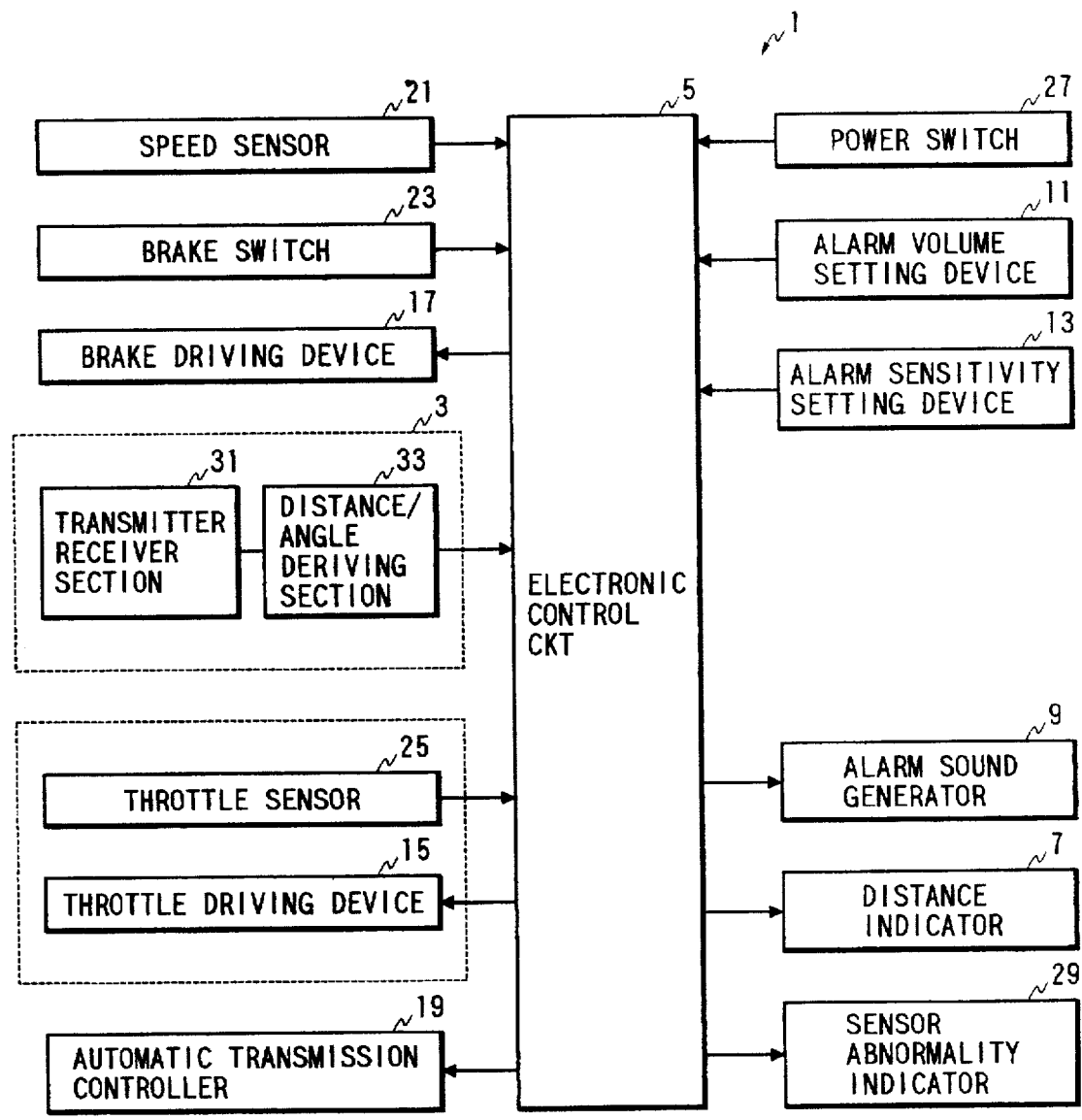
FIG. 1 is a block diagram showing a structure of a vehicle control system applied with the present invention, according to a preferred embodiment of the present invention.

FIG. 1 is a block diagram showing a structure of a vehicle control system 1 applied with the present invention, according to the preferred embodiment of the present invention. The vehicle control system 1 detects a preceding vehicle by a distance/angle measuring device 3 as radar means, and performs, depending on setting of a mode switch (not shown), one or both of a collision preventing control where an alarm sound is produced when the detected preceding vehicle gets into a given alarm range ahead of the subject vehicle and a pursuit running control where the vehicle speed is controlled so as to maintain a distance between the subject vehicle and the preceding vehicle to a given value.

As shown in the figure, a detection signal of the distance/angle measuring device 3 is inputted into an electronic control circuit 5. Based on the inputted detection signal, the electronic control circuit 5 recognizes the preceding vehicle, which will be described later, and outputs a driving signal to a distance indicator 7 so as to indicate a distance between the subject vehicle and the preceding vehicle. If the collision preventing control is selected and the preceding vehicle gets in the alarm range, the electronic control circuit 5 outputs a driving signal to an alarm sound generator 9 so as to produce an alarm sound. Further, an alarm volume setting device 11 and an alarm sensitivity setting device 13 are connected to the electronic control circuit 5 so that the volume of the alarm sound and the alarm sensitivity can be variable set.

Further, for controlling the speed upon selection of the pursuit running control, the electronic control circuit 5 outputs driving signals also to a throttle driving device 15 for driving a throttle valve, a brake driving device 17 for driving a brake, and an automatic transmission controller 19 for controlling an automatic transmission. The electronic control circuit 5 is further connected to a speed sensor 21 which outputs a signal depending on the vehicle speed, a brake switch 23 which outputs a signal depending on an operation state of the brake, and a throttle sensor 25 which outputs a signal depending on an open degree of the throttle valve, so as to receive data necessary for the foregoing various controls. Further, the electronic control circuit 5 is connected to a power switch 27 which feeds the power from a power circuit (not shown) in response to an operation of a key switch, and outputs a driving signal also to a sensor abnormality indicator 29 for alarming abnormality of the sensors 21 to 25.

The distance/angle measuring device 3 includes a transmitter-receiver section 31 and a distance/angle deriving section 33. The transmitter-receiver section 31 scans a laser beam ahead of the subject vehicle discontinuously per given angle (for example, 0.5°) within a given angular range and receives reflected light thereof. Further, based on a time until receipt of the reflected light, the distance/angle deriving section 33 derives a distance between the subject vehicle and an object and an angle (direction) of the object relative to the subject vehicle. Since the distance/angle measuring device itself is well known, detailed explanation thereof will be omitted. Instead of the laser beam, the electric wave, such as the microwave, or the ultrasonic wave may be used. Further, instead of the scan type, the distance/angle measuring device 3 may be of the monopulse type, wherein the transmitter-receiver section 31 includes two or more receiver sections, and the distance/angle deriving section 33 derives a distance and an angle based on difference in intensity or phase (time difference) of the received signals.

When the distance and the angle of the obstacle relative to the subject vehicle are derived, the distance/angle deriving section 33 sends the result of derivation (hereinafter referred to as "one-dimensional distance data") to the electronic control circuit 5. Then, the electronic control circuit 5 recognizes the obstacle in the following manner.

Figure 2:
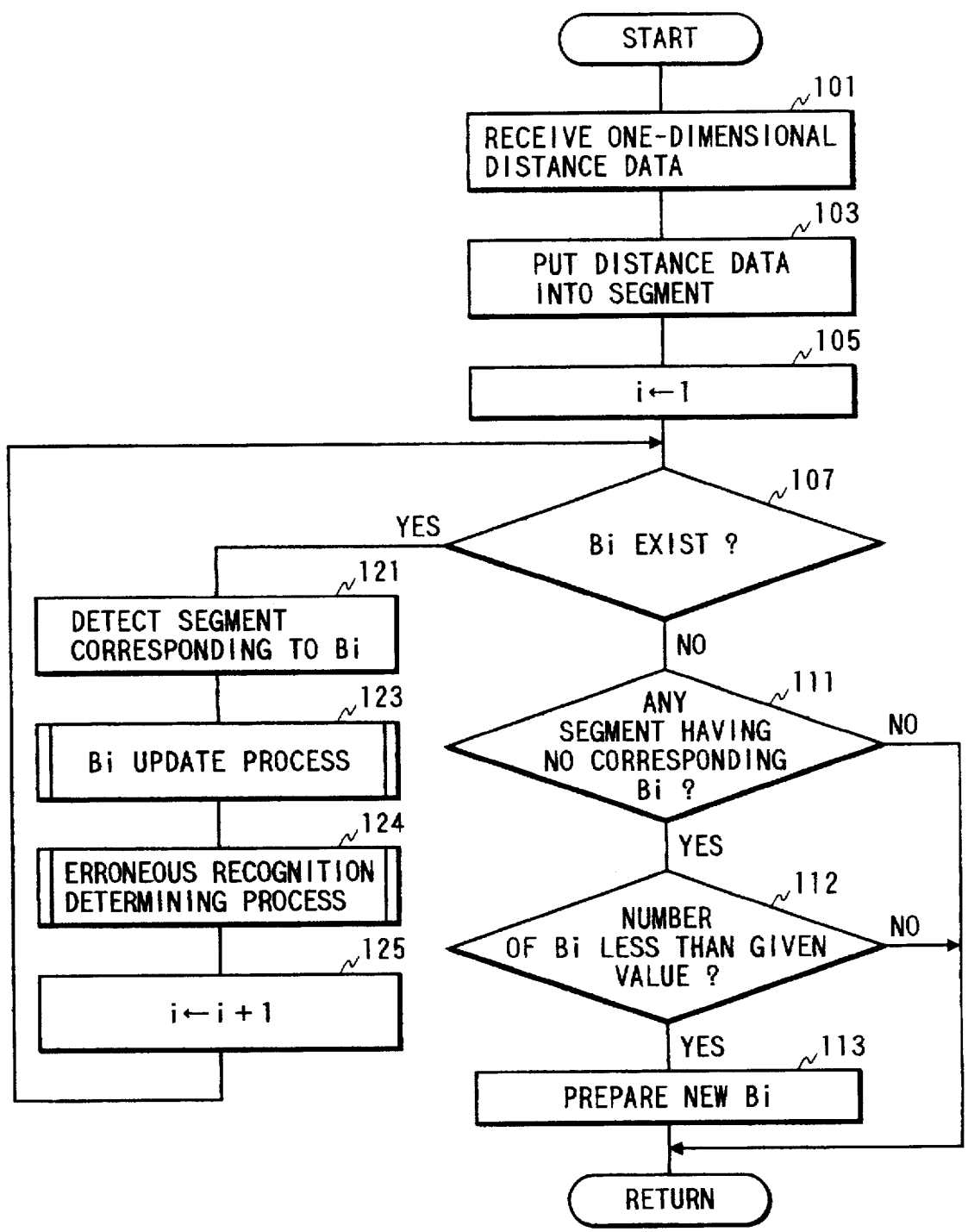
FIG. 2 is a flowchart representing an obstacle recognition process of the vehicle control system.

FIG. 2 is a flowchart representing a main routine of an obstacle recognition process to be executed by the electronic control circuit 5. This routine is executed per 128 ms.

Figure 3A:
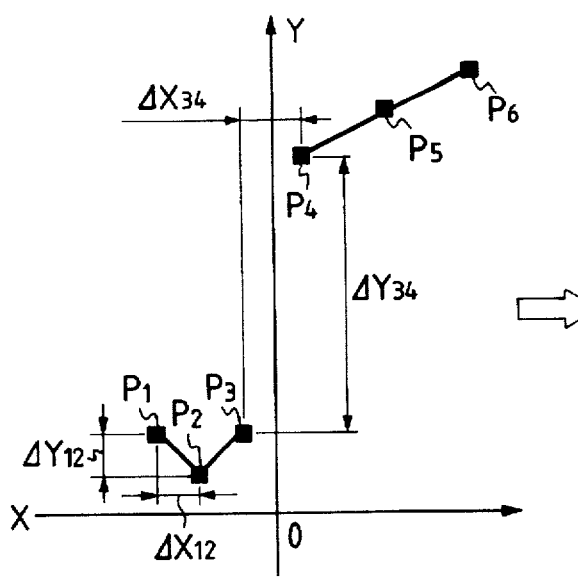
FIGS. 3A and 3B are diagrams for explaining how to put distance data into segments in the obstacle recognition process.

In FIG. 2, at step 101, the electronic control circuit 5 receives the one-dimensional distance data from the distance/angle deriving section 33 and applies a given conversion to the received data so as to recognize a position of the obstacle on the orthogonal coordinates. Since the distance/angle measuring device 3 scans the laser beam discontinuously per given angle (for example, 0.5°), obstacles are recognized at this time as discontinuous points as shown by points P1 to P3 and P4 to P6 in FIG. 3A.

Figure 3B:
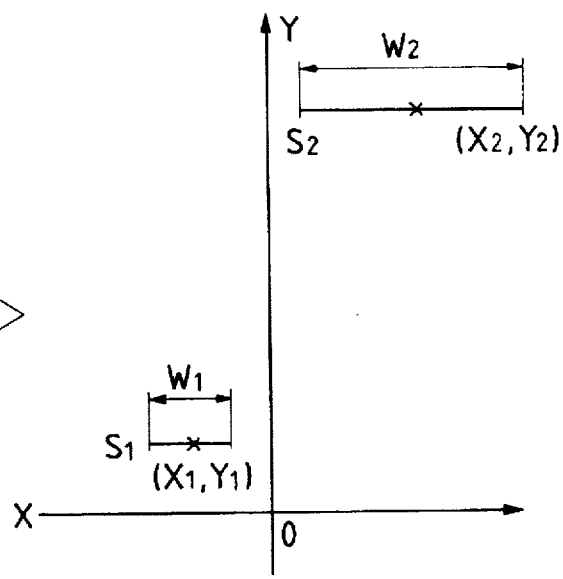

At subsequent step 103, among the points recognized at step 101, neighboring data are unified and recognized as a segment only having a length in a widthwise direction of the subject vehicle. "neighboring" may be defined by various conditions. In this preferred embodiment, "neighboring" is defined with an interval between the points along the X-axis, that is, in the widthwise direction of the vehicle, being equal to or less than an irradiation interval of the laser beam, and with an interval of the points along the Y-axis, that is, in the longitudinal direction of the vehicle, being less than 3.0 m. For example, in FIG. 3A, an interval ΔX12 between the points P1 and P2 along the X-axis is no greater than the irradiation interval, and an interval ΔY12 therebetween along the Y-axis is also less than 3.0 m. Thus, the points P1 and P2 can be unified. On the other hand, since an interval ΔY34 between the points P3 and P4 along the Y-axis is greater than 3.0 m, the points P3 and P4 can not be unified. Subsequently, as shown in FIG. 3B, sets of the unifiable points (P1 to P3 and P4 to P6) are recognized as segments S1 and S2 having widths W1 and W2 from leftmost to rightmost, respectively. Each point is set to have a width depending on an irradiation interval of the laser beam. Positions of the segments S1 and S2 along the Y-axis are set by the mean values of Y coordinates of the points P1 to P3 and the points P4 to P6, respectively. The electronic control circuit 5 defines the segments S1 and S2 by parameters of their center coordinates (X1, Y1), (X2, Y2) and their widths W1 and W2, respectively, and performs later-described various calculations. If sets of unifiable points exist over no less than 6 m along the Y-axis, data of the respective points are all discarded without recognizing the sets of the points as segments.

At subsequent step 105, a variable t is set to 1, and then the routine proceeds to step 107. At step 107, it is determined whether an object model Bi (i=1, 2, ...) exists or not. The object model Bi is a model of an obstacle prepared for each segment at step 113, which is be described later. Since the object model Bi is not prepared at the start of the routine, negative answer is produced at this time so that the routine proceeds to step 111. At step 111, it is determined whether there is any segment having no corresponding object model Bi. As described above, since no object model Bi is prepared at the start of the routine, all the segments recognized at step 103 have no corresponding object model Bi at this time. Thus, positive answer is produced, and the routine proceeds to step 112.

At step 112, it is determined whether the number of the object models Bi is less than a given value. This given value is set in the following manner: In general, the number of obstacles, such as preceding vehicles, to appear within the given angle range of the laser beam scanning has a certain upper limit. If further obstacles are recognized exceeding that upper limit, those obstacles are usually unnecessary roadside things. In view of this, if the foregoing given value is set to be greater than that upper limit to some degree, the foregoing collision preventing control or the pursuit running control can be executed by monitoring only those obstacles recognized as the object models Bi whose number is within the foregoing given value. Since the number of the object models Bi is less than the foregoing given value at this time, positive answer is produced and the routine proceeds to step 113.

At step 113, an object model Bi is newly prepared for each of the segments, having no Bi, in order from the one which is closest to the subject vehicle, and then the routine is temporarily terminated. In this case, if the number of the object models Bi reaches the foregoing given value while Bi are prepared successively, no further Bi are prepared.

Each object model Bi includes current center coordinates (X, Y), a width W, relative velocities Vx, Vy along the X-axis and the Y-axis, respectively, past 16 times data of the center coordinates (X, Y), and states of a state flag Fi. Upon newly preparing Bi, the foregoing data are set in the following manner: The center coordinates (X, Y) and the width are set to the center coordinates and the width of the segment. Vx is set to 0 (zero) and Vy is set to $-\frac{1}{2}$ times the vehicle speed. The past 16 times center coordinate data are set vacant. The flag Fi is set to 0 (zero). The flag Fi represents whether the object model Bi is in an unrecognized state, a recognized state or an extrapolative state, which will be described later. The flag Fi is set to 0 in the unrecognized state of Bi, 1 in the recognized state of Bi or 2 in the extrapolative state of Bi. Thus, the unrecognized state is set upon new preparation of Bi.

Figure 4:
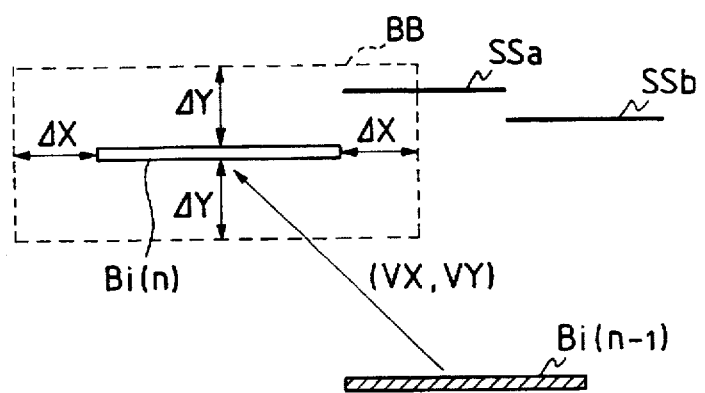
FIG. 4 is a diagram for explaining the definition of a segment corresponding to an object model in the obstacle recognition process.

On the other hand, if step 107 yields positive answer, that is, if the object model Bi exists, the routine proceeds to step 121 where a segment corresponding to Bi is detected. The segment corresponding to the object model Bi is defined as follows: As shown in FIG. 4, assuming that the object model Bi moves from a position B1(n-1) thereof upon the last execution of this routine with relative velocities (Vx, Vy) upon the last execution of this routine, an estimated current position Bi(n) of Bi is derived. Subsequently, an estimated movement range BB having given widths ΔX and ΔY along the X-axis and the Y-axis, respectively, is set around the estimated position Bi(n). A segment SSa which even partly overlaps with the estimated movement range BB is determined to correspond to the object model Bi. On the other hand, a segment SSb which does not overlap at all with the estimated movement range BB is determined not to correspond to the object model Bi. The given widths ΔX and ΔY are set as follow:

(1) When Bi is in the unrecognized state (Fi=0), ΔX=2.5 m and ΔY=5.0 m.

(2) When Bi is in the recognized state (Fi=1) and Cai, which will be described later, is less than 6, ΔX=2.0 m and ΔY=4.0 m.

(3) When Bi is in the recognized state (Fi=1) and Cai is equal to or greater than 6 or when Bi is in the extrapolative state (Fi=2), ΔX=1.5 m and ΔY=3.0 m.

In this case, if a plurality of segments are detected as overlapping with the estimated movement range BB, one segment is selected, which is determined to be a segment corresponding to the object model Bi.

Figure 5A:
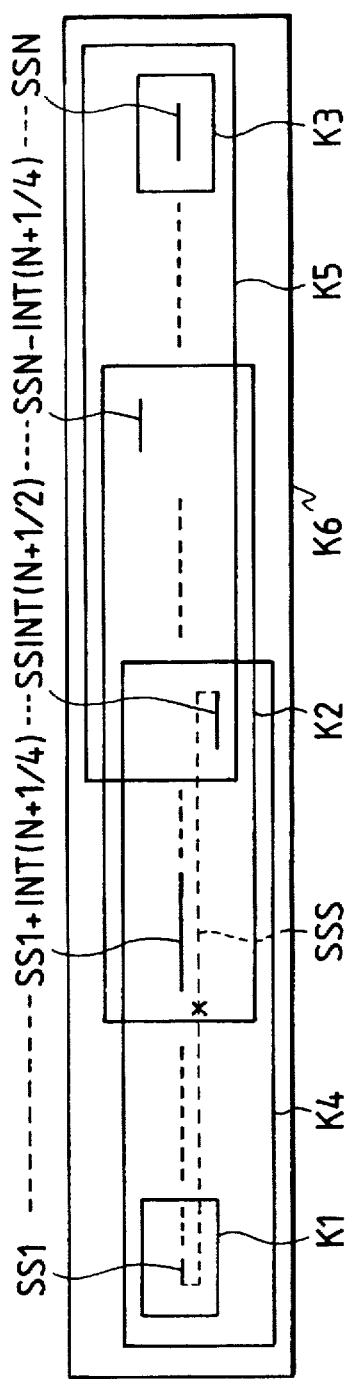
FIGS. 5A and 5B are diagrams for explaining how to select a segment corresponding to an object model in the obstacle recognition process when a plurality of segments are detected as overlapping with an estimated movement range of the object model.

FIG. 5A is a diagram for explaining how to select a corresponding segment from N segments SS overlapping with the estimated movement range BB. First, numbers are assigned to the N segments SS, from leftmost, in order of SS1, SS2, ..., SSN. Then, from among them, five segments as identified by SS1, SS1+INT(N+¼), SSINT(N+½), SSN-INT(N+¼), and SSN are selected, wherein suffix INT(N+¼) and suffix INT(N+½) represent INT{(N+¼} and INT{(N+1)/2}, respectively, and INT is a symbol of operation representing an integer part of a value within brackets { }. For example, if N=10, $$INT(11/4)=INT(2.75)=2$$

$$INT(11/2)=INT(5.5)=5$$

so that SS1, SS3, SS5, SS8 and SS10 are selected. Subsequently, based on the selected five segments SS1 to SSN, six candidates K1 to K6 are prepared as shown in FIG. 5A. Specifically, the candidate K1 is composed of only the segment SS1, K2 is composed of SS1+INT(N+¼), SSINT(N+½) and SSN-INT(N+¼), K3 is composed of only SSN, K4 is composed of SS1, SS1+INT(N+¼) and SSINT(N+½), K5 is composed of SSINT(N+½), SSN-INT(N+¼) and SSN, and K6 is composed of all the five segments SS1, SS1+INT(N+¼), SSINT(N+½), SSN-INT(N+¼) and SSN.

Then, when the candidate is composed of the plurality of segments SS, the segments are unified in the following manner: Specifically, such a segment is imagined whose width corresponds to a length from a leftmost end of the leftmost segment to a rightmost end of the rightmost segment and whose center Y coordinate is a weighted mean value of center Y coordinates of the respective segments SS weighted by the widths of the respective segments SS. Subsequently, the center coordinates and the width of each of the segments and the imagined segments of the candidates are compared with the center coordinates and the width of the foregoing object model Bi at the estimated position Bi(n) to derive deviations ΔX, ΔY and ΔW, respectively. Then, the deviations ΔX, ΔY and ΔW are evaluated by the following evaluation function:

$$\alpha\Delta X+\beta\Delta Y+\gamma\Delta W$$

wherein coefficients α, β and γ can be set depending on a characteristic of the distance/angle measuring device 3 or the like. In this embodiment, α=γ=1 and β=0.3. The candidate (one of K1 to K6) which minimizes a value of the evaluation function is selected, and the segment or the imagined segment of the selected candidate is determined to be the segment corresponding to the object model Bi. For example, if the candidate K4 is selected in FIG. 5A, a segment SSS is set to be the corresponding segment, which is thus defined by the center coordinates and the width of the segment SSS. After selection of the corresponding segment SSS, all the other segments SS overlapping with the estimated movement range BB are determined not to correspond to the object model Bi. Through the foregoing process, it can be precisely determined whether the segment recognized at step 103 is identical with the segment previously recognized.

Figure 5B:
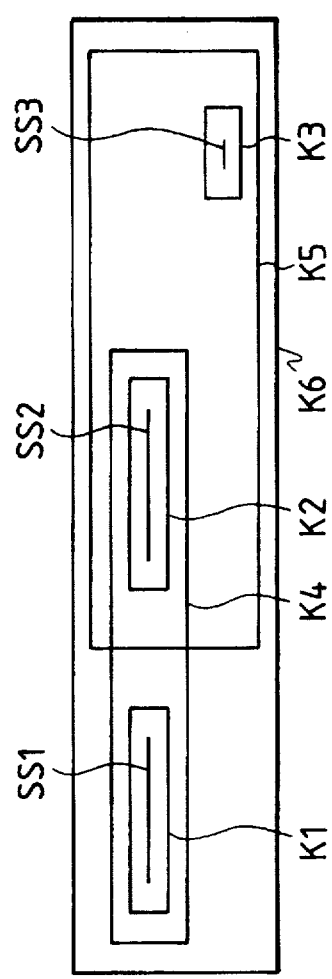

Even if the number of segments overlapping with the estimated movement range BB is no less than 2 and no greater than 4, six candidates can still be prepared similarly by allowing overlapping of the foregoing five segments SS1 to SSN. For example, if N=3, INT{(N+1)/4}=1 and INT{(N+1)/2}=2 so that SS1, SS2, SS2, SS2 and SS3 can be selected as the five segments. Accordingly, as shown in FIG. 5B, the candidate K1 is composed of only SS1, K2 is composed of only SS2, K3 is composed of only SS3, K4 is composed of SS1 and SS2, K5 is composed of SS2 and SS3 and K6 is composed of SS1, SS2 and SS3.

Subsequently, through steps 123 and 124, a Bi update process and an erroneous recognition determining process are executed, respectively. Then, at step 125, the variable i is incremented by one, and the routine proceeds to step 107.

Figure 6:
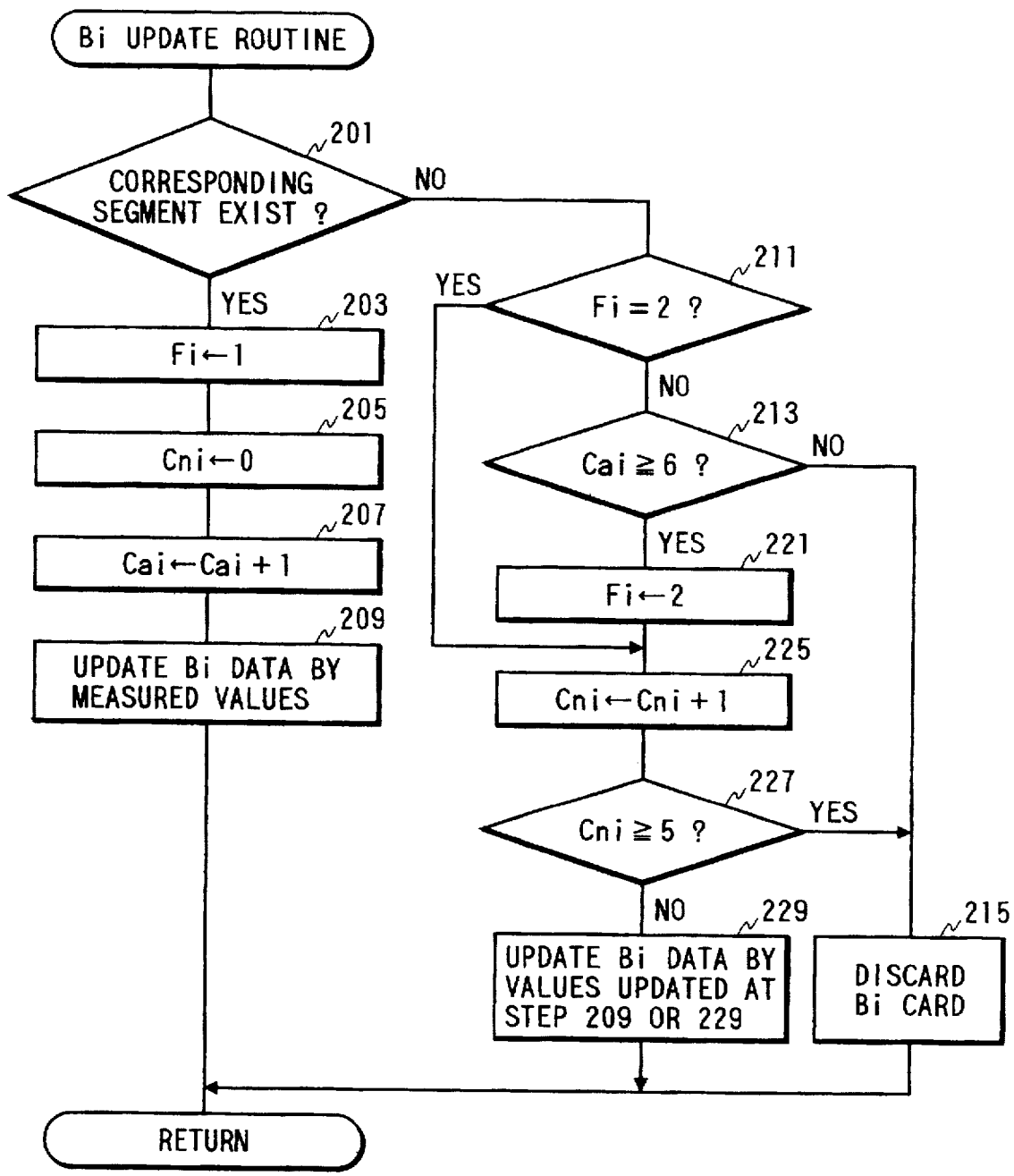
FIG. 6 is a flowchart representing an object model data update routine in the obstacle recognition process.

FIG. 6 is a flowchart representing a Bi update routine for performing the Bi update process. First at step 201, it is determined whether the corresponding segment is detected or not at step 121 in FIG. 2. If positive, the routine proceeds to step 203 where the state flag Fi is set to 1 representing that the object model Bi is in the recognized state. Then, step 205 resets a counter Cni which counts the number of times or frequency of no detection of a segment corresponding to Bi, while step 207 increments a counter Cai which counts the number of times or frequency of detection of a segment corresponding to Bi. Subsequently, at step 209, the Bi data is updated using data of the corresponding segment, and then the routine returns to the main routine of FIG. 2.

The Bi data update process will be described further in detail. As described before, the corresponding segment has data of the center coordinates and the width. If this data is given by (Xs, Ys), and Ws, new center coordinates and a width of the object model Bi are also given by (Xs, Ys) and Ws. Further, new relative velocities (Vx, Vy) of Bi are given by the following equation:

$$(Vx, Vy) = \left( \frac{Xs - Xk}{dt} \quad \frac{Ys - Yk}{dt} \right)$$

wherein (Xk, Yk) is data obtained at a lapse of time closest to 1.0 second from the data measurement of the oldest data among the past 16 times data of the center coordinates of Bi (as appreciated, the oldest data was obtained 2 seconds [=0.128×16] before), and dt represents a lapse of time from the data measurement of (Xk, Yk).

Accordingly, the Bi update process is performed assuming that the object model Bi and the corresponding segment correspond to the same obstacle.

On the other hand, if answer at step 201 is negative, the routine proceeds to step 211 where it is determined whether the state flag Fi of the object model Bi is set to 2 representing that Bi is in the extrapolative state. Since Fi=0 or 1 when the routine first comes to step 211, step 211 yields negative answer at this time and the routine proceeds to step 213. Step 213 determines whether a value of the counter Cai is equal to or greater than 6 (Cai≧6). If Cai<6, the routine proceeds to step 215 where all the data about the object model Bi is discarded, and the routine returns to the main routine.

Specifically, while the segment corresponding to Bi is detected, the execution of steps 201 to 209 is repeated and thus the counter Cai is gradually incremented (step 207). On the other hand, if the object model Bi is lost while Cai<6 (step 213: NO), the Bi data is discarded (step 215). Through this process, data of the temporarily detected Bi can be discarded so that unnecessary data about the roadside thing can be discarded and thus the recognition of the obstacle (object model Bi) can be achieved more precisely.

On the other hand, if Cai≧6 at step 213, that is, if the object model Bi is lost after Cai has reached 6, the routine proceeds to step 221 where the state flag Fi is set to 2 representing that Bi is in the extrapolative state. Subsequently, at step 225, the counter Cni is incremented by one. Then, at step 227, it is determined whether Cni≧5. If Cni<5, the routine proceeds to step 229 where the Bi data is updated using the values updated at step 209 when Cni=1, while otherwise using the values updated at step 229. Specifically, step 229 derives new center coordinates (X, Y) of the object model Bi assuming that the relative velocities (Vx, Vy) and the width W remain unchanged.

Accordingly, if the object model Bi is lost after Cai has reached 6, the state flag Fi is set to 2 representing that Bi is in the extrapolative state, and the Bi data is updated using the values derived at step 209 or 229. In this case, the routine proceeds to step 225 directly from step 221 or 211 so as to gradually increment the counter Cni. Then, if Cni≧5 at step 227, that is, if Bi continues to be lost five times, the routine proceeds to step 215 where the Bi data is discarded. Through this process, even if the obstacle (object model Bi) whose existence has been recognized six times or more is lost temporarily (Cni<5), if again discovered (step 201: YES), it can be pursued successively as the identical obstacle.

Figure 7:
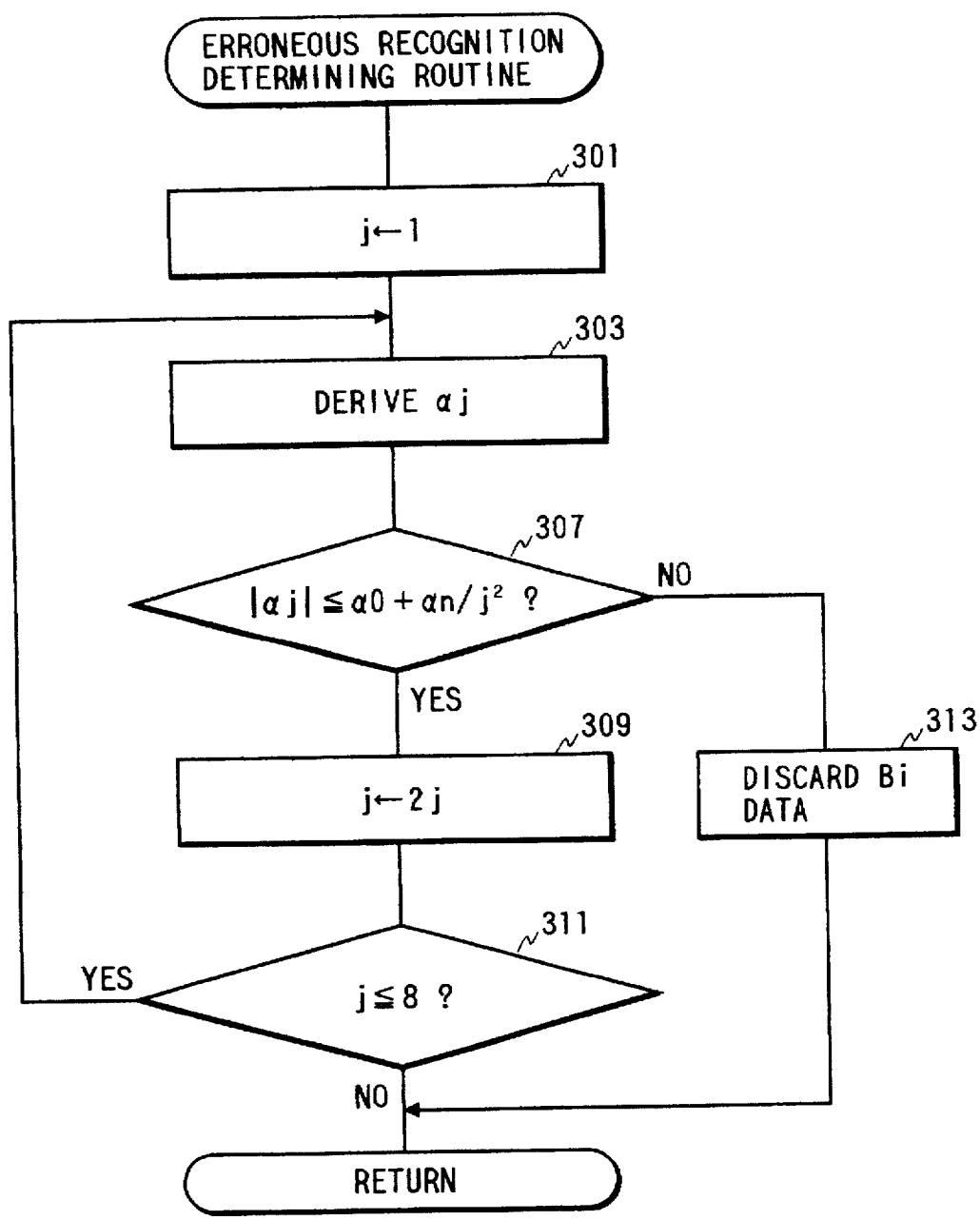
FIG. 7 is a flowchart representing an erroneous recognition determining routine in the obstacle recognition process.

FIG. 7 is a flowchart representing an erroneous recognition determining routine corresponding to step 124 in FIG. 2. First at step 301, a variable j is set to 1. Subsequently, at step 303, a relative acceleration αj of the object model Bi is derived using the following equation:

$$\alpha j = \frac{\frac{Ys - Ys - j}{j*\Delta t} - \frac{Ys - j - Ys - 2j}{j*\Delta t}}{j*\Delta t}$$

$$= \frac{Ys + Ys - 2j - 2Ys - j}{j^2*\Delta t^2}$$

wherein Ys represents a current Y coordinate of the object model Bi, Ys-j represents a j-times prior Y coordinate of Bi, and Δt represents a measurement period (128 ms in this embodiment) of Bi.

If past Y coordinate data of the object model Bi is insufficient so that the relative acceleration αj can not be derived using the foregoing equation, the relative acceleration αj is set to 0.

Subsequently, at step 307, it is determined whether |αj|≦α0+αn/j², wherein α0 and αn represent given constants (for example, α0=10 m/s², αn=120 m/s²). If |αj|≦α0+αn/j², the routine proceeds to step 309 where j is set to 2j. Then, at step 311, it is determined whether j≦8. If j≦8, the routine proceeds to step 303 to repeat the foregoing process. If the execution of steps 303 to 311 is repeated four times, then j=16>8 so that step 311 yields negative answer and the routine returns to the main routine.

Figure 8A:
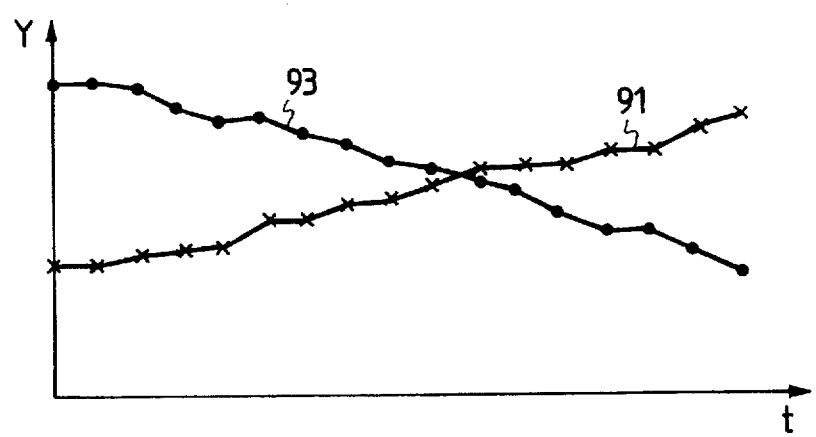
FIGS. 8A and 8B are diagrams for explaining the principle of determination achieved by the erroneous recognition determining routine.

On the other hand, if |αj|>α0+αn/j² at step 307, the routine proceeds to step 313 where all the data about the object model Bi is discarded. Then, the routine returns to the main routine. Through this process, data about a roadside thing (for example, a reflector provided on the guard rail), which has been recognized as the object model Bi, can be discarded in the following manner:

Specifically, if a preceding vehicle is recognized as the object model Bi, Y coordinates of Bi change relatively moderately with a lapse of time t as shown in FIG. 8A. It has been experimentally confirmed that the relative acceleration of the preceding vehicle falls within a given range. In FIG. 8A, a curve 91 represents a case where the object model Bi corresponds to a preceding vehicle moving away from the subject vehicle, while a curve 93 represents a case where Bi corresponds to a preceding vehicle moving closer to the subject vehicle. Accordingly, in FIG. 8A, the relative acceleration $\alpha j$ satisfies $|\alpha j| \leq \alpha 0 + \alpha n/j^2$.

Figure 8B:
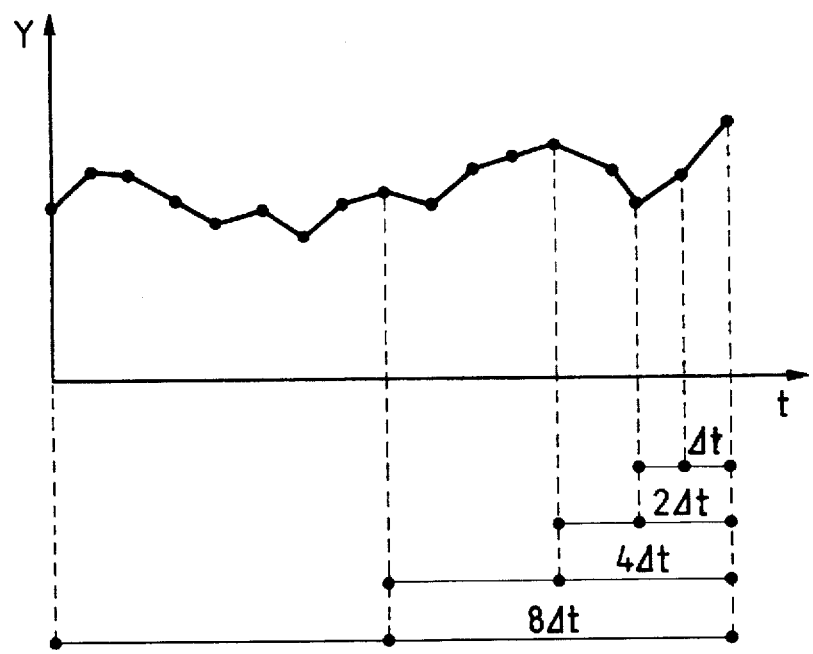

On the other hand, if a roadside thing is recognized as the object model Bi, Y coordinates of Bi change quite irregularly as shown in FIG. 8B. Therefore, it is possible that the absolute value of the relative acceleration $\alpha j$ exceeds $\alpha 0 + \alpha n/j^2$. Accordingly, if such a condition is established (step 307: NO), all the data about Bi is discarded (step 313) as determining that Bi corresponds to the roadside thing.

Referring back to FIG. 2, when the data of all the object models Bi (i=1, 2, . . . ) are updated through the loop including steps 107, 121, 123, 124 and 125, there is no object model Bi corresponding to the variable i finally incremented at step 125. Then, step 107 yields negative answer so that the routine proceeds to the foregoing step 111. If there is/are a segment/segments which does/do not correspond to any of the object models Bi (step 111: YES), the routine proceeds to step 112. And if the number of Bi is less than the foregoing given value at step 112, the routine proceeds to step 113 where an object model/object models Bi is/are newly prepared for the segment/segments, but with the total Bi number no greater than the foregoing given value. Then, the routine is temporarily terminated. On the other hand, if all the segments corresponds to the object models Bi (step 111: NO), the routine is temporarily terminated. As appreciated, at step 113, an i value of a newly prepared object model Bi is set to be greater by one relative to the existing greatest i value.

As described above, in this embodiment, the relative acceleration $\alpha j$ (j=1, 2, 4, 8) of the object model Bi is derived (step 303) and, when the relative acceleration $\alpha j$ is not within the foregoing given range, all the data about the object model Bi is discarded (step 313). Thus, the roadside thing can be excluded from the objects of recognition as the object model Bi so that recognition of the roadside thing as the obstacle can be effectively prevented.

Further, in this embodiment, the relative accelerations $\alpha j$ are derived at four sampling periods of $\Delta t$, $2\Delta t$, $4\Delta t$ and $8\Delta t$. As the sampling period is shortened, it becomes easier to catch an instantaneous value of the acceleration. However, since an influence of noise is increased, the criterion for judging whether to exclude the object model Bi should be relaxed. Specifically, a term of $\alpha n/j^2$ at step 307 should be set greater. Conversely, as the sampling period is prolonged, an influence of noise is reduced. However, since the acceleration is averaged, it becomes difficult to catch an instantaneous value. Specifically, although a term of $\alpha n/j^2$ at step 307 can be set smaller, $|\alpha j|$ also becomes smaller. In this embodiment, a plural kinds of relative accelerations $\alpha j$ with different sampling periods are derived and, if at least one of the relative accelerations $\alpha j$ does not fall within the corresponding given range, which is set for each of the plural kinds of the relative accelerations, all the data about the object model Bi is discarded. Thus, the roadside thing can be precisely excluded from the objects of recognition as the object model Bi. Accordingly, the accuracy in recognition of the obstacle can be further improved.

Further, in this embodiment, it can be reliably determined whether the obstacle recognized as a segment is identical with the object model Bi previously recognized. Thus, the relative velocities (Vs, Vy) of the obstacle, corresponding to the object model Bi, to the subject vehicle can be precisely derived. Accordingly, for example, through the following process, it can be precisely determined whether the obstacle is moving or stopped. Specifically, if the object model Bi satisfies a condition of $-Vy > Vs \times 0.7$ or $Vy + Vs \leq 10$ km/h, wherein Vs represents a speed of the subject vehicle, it is determined that the obstacle recognized by the object model Bi is stopped. On the other hand, if the object model Bi once determined to be stopped satisfies a condition of $-Vy < Vs \times 0.5$ and $Vy + Vs > 20$ km/h, the determination is changed that the obstacle recognized by the object model Bi is moving. Through this process, the erroneous detection of the stopped thing as the running vehicle can be reliably prevented.

Further, in this embodiment, the obstacle is recognized as a segment having only a width. Thus, only the center coordinates and the width are required as parameters for identifying the obstacle so that the process for estimating the next position of the obstacle can be simplified. Further, if sets of unifiable points exist over no less than 6 m along the Y-axis, data of the respective points are all discarded without recognizing the sets of the points as segments (step 103). Thus, the roadside thing, such as the guard rail, which extends in the longitudinal direction of the subject vehicle can be ignored in advance to some degree. Accordingly, the process through the loop including steps 107, 121, 123, 124 and 125 can be simplified to reduce a load of the electronic control circuit 5 so that the processing speed in the obstacle recognition can be further improved.

further, in this embodiment, the number of the object models Bi is limited to no greater than the given value. This also simplifies the process through the loop including steps 107, 121, 123, 124 and 125 to reduce a load of the electronic control circuit 5 so that the processing speed in the obstacle recognition can be further improved. Further, if any segment having no corresponding object model Bi is recognized, an object model Bi is newly prepared for each of the segments, having no Bi, in order from the one which is closest to the subject vehicle (step 113). Thus, the obstacle close to the subject vehicle can be recognized further reliably. Therefore, even if the foregoing given value at step 112 is set smaller, the safety of the subject vehicle can be ensured so that the process through the foregoing loop can be further simplified. Accordingly, processing speed in the obstacle recognition can be further improved.

Further, in this embodiment, even if a plurality of segments SS, which seem to correspond to the object model Bi, are detected, identities of the segments SS1 to SSN relative to Bi can be compared with each other. Since the process is continued as determining the segment SS or the candidate K having the highest identify to be identical with the previously recognized object model Bi, the obstacle corresponding to the object model Bi can be pursued reliably. Further, since the identities are compared based on the center coordinates and the widths of the segments SS or the candidates K, the identities can be compared more precisely as compared with the case where the identities are compared only based on the center coordinates. Accordingly, the pursuit of the obstacle corresponding to the object model Bi can be continued more precisely.

Further, setting of the estimated movement range BB, comparison of the identities of segments relative to Bi and derivation of the relative acceleration may be performed in different manners.

Figure 9:
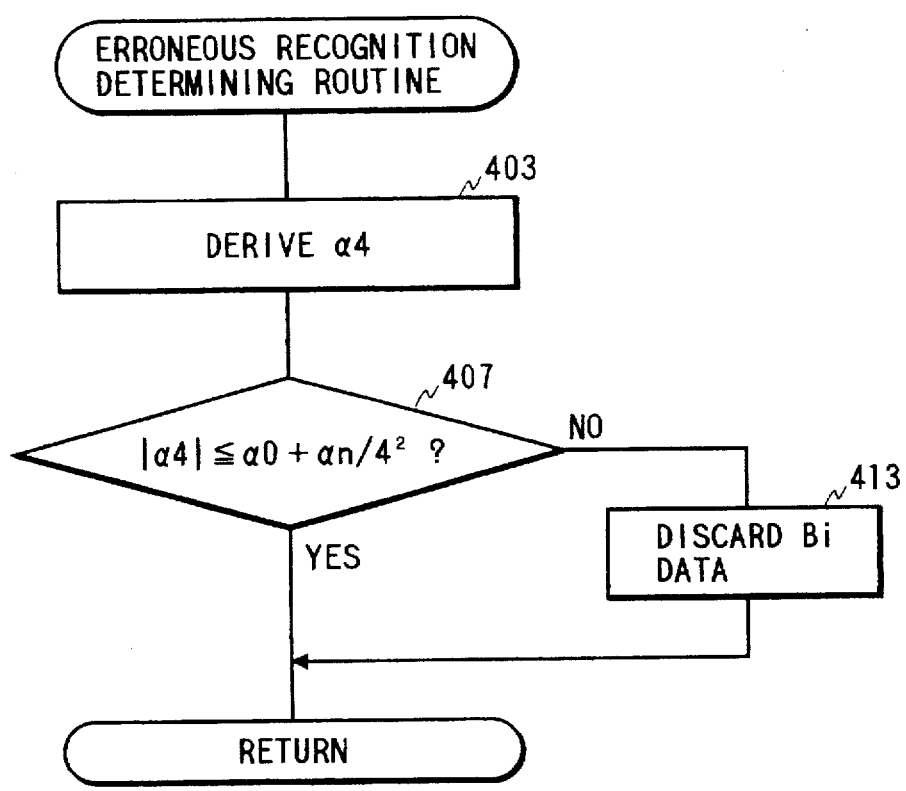
FIG. 9 is a flowchart representing a modification of the erroneous recognition determining routine.
Figure 10:
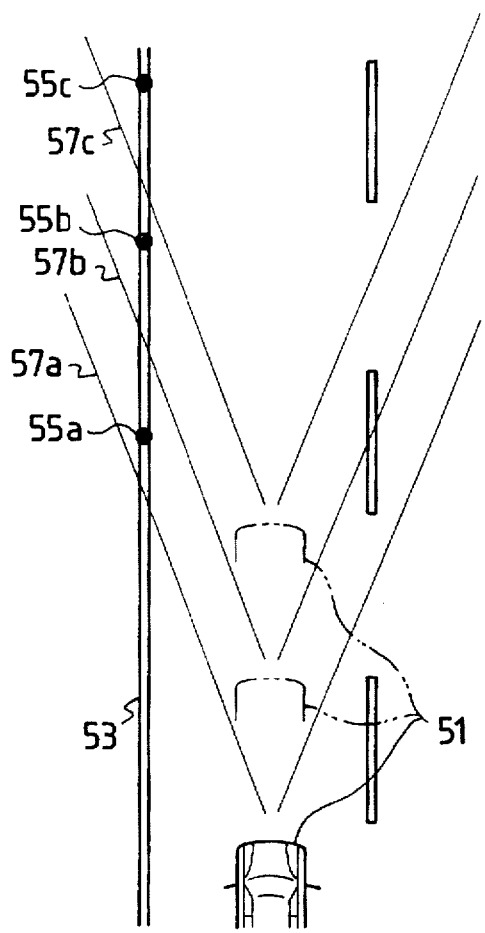
FIG. 10 is an explanatory diagram showing a running state of a vehicle which induces a problem of the prior art.
Figure 11:
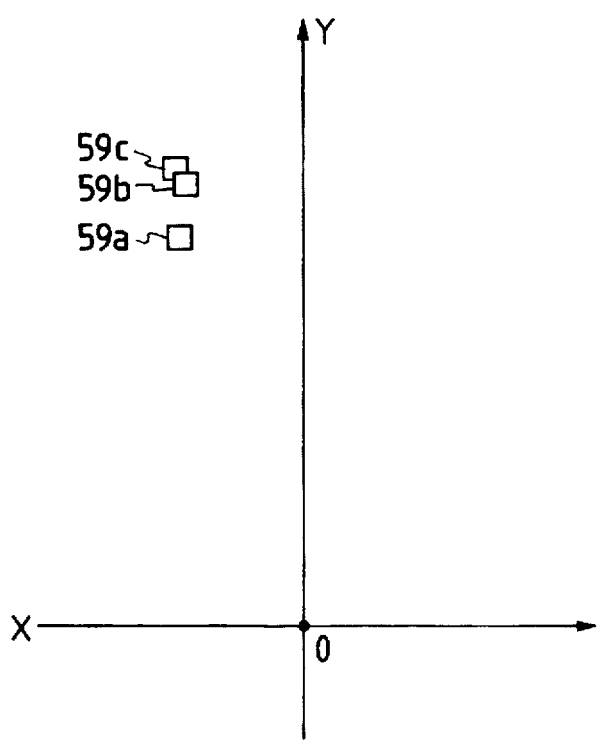
FIG. 11 is a diagram for explaining an obstacle recognition state in the vehicle running state shown in FIG. 10.

For example, in this embodiment, the relative accelerations $\alpha j$ (j=1, 2, 4, 8) are derived at mutually different four sampling periods. However, the relative acceleration may be derived using only one sampling period. In an erroneous recognition determining routine shown in FIG. 9, only relative acceleration (α4) corresponding to j=4 in the foregoing embodiment is derived.

Specifically, first at step 403, the relative acceleration α4 is derived by substituting 4 for the variable j in the foregoing equation. Then, at step 407, it is determined whether $|\alpha 4| \leq \alpha 0 + \alpha n/4^2$. If $|\alpha 4| \leq \alpha 0 + \alpha n/4^2$, the routine returns to the main routine. On the other hand, if $|\alpha 4| > \alpha 0 + \alpha n/4^2$, all the data about the object model Bi is discarded at step 413, and the routine returns to the main routine. Even through this process, data of the roadside thing, which has been recognized as the object model Bi, can be discarded.

Further, the present invention is also applicable to a system where an obstacle is recognized as a set of points or a block.

While the present invention has been described in terms of the preferred embodiment, the invention is not to be limited thereto, but can be embodied in various ways without departing from the principle of the invention as defined in the appended claims.

What is claimed is:

1. An obstacle recognition system for a vehicle, comprising:

radar means for irradiating transmission wave over a given angle around the subject vehicle and, based on reflected wave of the transmission wave, detecting angles and distances of a reflecting object relative to the subject vehicle;

recognition means for recognizing an obstacle around the subject vehicle based on the angles and the distances detected by said radar means;

position estimating means for estimating a position of the obstacle to be recognized by said recognition means, based on a position of the obstacle previously recognized;

identity determining means for comparing the position of the obstacle estimated by said position estimating means and a position of the obstacle recognized by said recognition means so as to determine whether the obstacle currently recognized by said recognition means is identical with the obstacle previously recognized;

acceleration deriving means for deriving relative acceleration of the obstacle determined plural times by said identity determining means to be identical with the previously recognized obstacle; and excluding means for, when the relative acceleration derived by said acceleration deriving means is outside a given range, excluding the corresponding obstacle from objects of subsequent position estimation performed by said position estimating means and subsequent identity determination performed by said identity determining means.

2. The obstacle recognition system according to claim 1, wherein said acceleration deriving means derives relative accelerations of plural kinds with different sampling periods, and wherein said excluding means, when at least one of said relative accelerations is outside a corresponding given range which is set for each of said plural kinds of the relative accelerations, excludes the corresponding obstacle from the objects of the subsequent position estimation performed by said position estimating means and the subsequent identity determination performed by said identity determining means.

3. The obstacle recognition system according to claim 1, wherein said recognition means comprises point recognition means for recognizing the obstacle as points based on the angles and the distances detected by said radar means, unifying means for unifying neighboring points among the points recognized by said point recognition means, and segment recognition means for recognizing a set of the points unified by said unifying means, as a segment having only a length in a widthwise direction of the subject vehicle.

4. The obstacle recognition system according to claim 2, wherein said recognition means comprises point recognition means for recognizing the obstacle as points based on the angles and the distances detected by said radar means, unifying means for unifying neighboring points among the points recognized by said point recognition means, and segment recognition means for recognizing a set of the points unified by said unifying means, as a segment having only a length in a widthwise direction of the subject vehicle.

* * * * *